United States Patent [19]

Spisak

[11] 4,110,577
[45] Aug. 29, 1978

[54] WELDING MACHINE

[76] Inventor: Edward G. Spisak, 35700 Oakwood La., Westland, Mich. 48185

[21] Appl. No.: 768,586

[22] Filed: Feb. 14, 1977

Related U.S. Application Data

[63] Continuation-in-part of Ser. No. 639,398, Dec. 10, 1975, abandoned.

[51] Int. Cl.² .............................................. B23K 11/08
[52] U.S. Cl. ................... 219/101; 219/59.1; 219/60 A; 219/132; 219/121 P
[58] Field of Search ................... 219/59, 60 R, 64, 67, 219/97, 101, 132, 161, 121 P; 228/15.1, 17.5, 49 R, 49 A

[56] References Cited

U.S. PATENT DOCUMENTS

| | | |
|---|---|---|
| 3,360,138 | 12/1967 | Gordon et al. ................... 228/49 R |
| 3,609,276 | 9/1971 | Cavagnero et al. .................... 219/64 |
| 3,654,419 | 4/1972 | Ovando .............................. 219/60 R |
| 3,692,974 | 9/1972 | Thomason et al. ............... 219/132 X |
| 3,808,393 | 4/1974 | Goodwin et al. ...................... 219/97 |
| 3,937,914 | 2/1976 | Larson et al. ...................... 219/59 X |

*Primary Examiner*—Arthur T. Grimley
*Assistant Examiner*—Mark Paschall
*Attorney, Agent, or Firm*—Fisher, Gerhardt & Groh

[57] ABSTRACT

A welding machine for automatically welding abutting workpiece portions in which the workpiece portions are aligned by a gauge and after being clamped in such a position, the gauge is automatically removed and the clamped ends are moved into abutting relationship to each other to be welded together. After the weld is completed the gauge is moved automatically to engage and eject the welded part and at the same time position the gauge and place the machine in condition to receive the next part to be welded.

14 Claims, 9 Drawing Figures

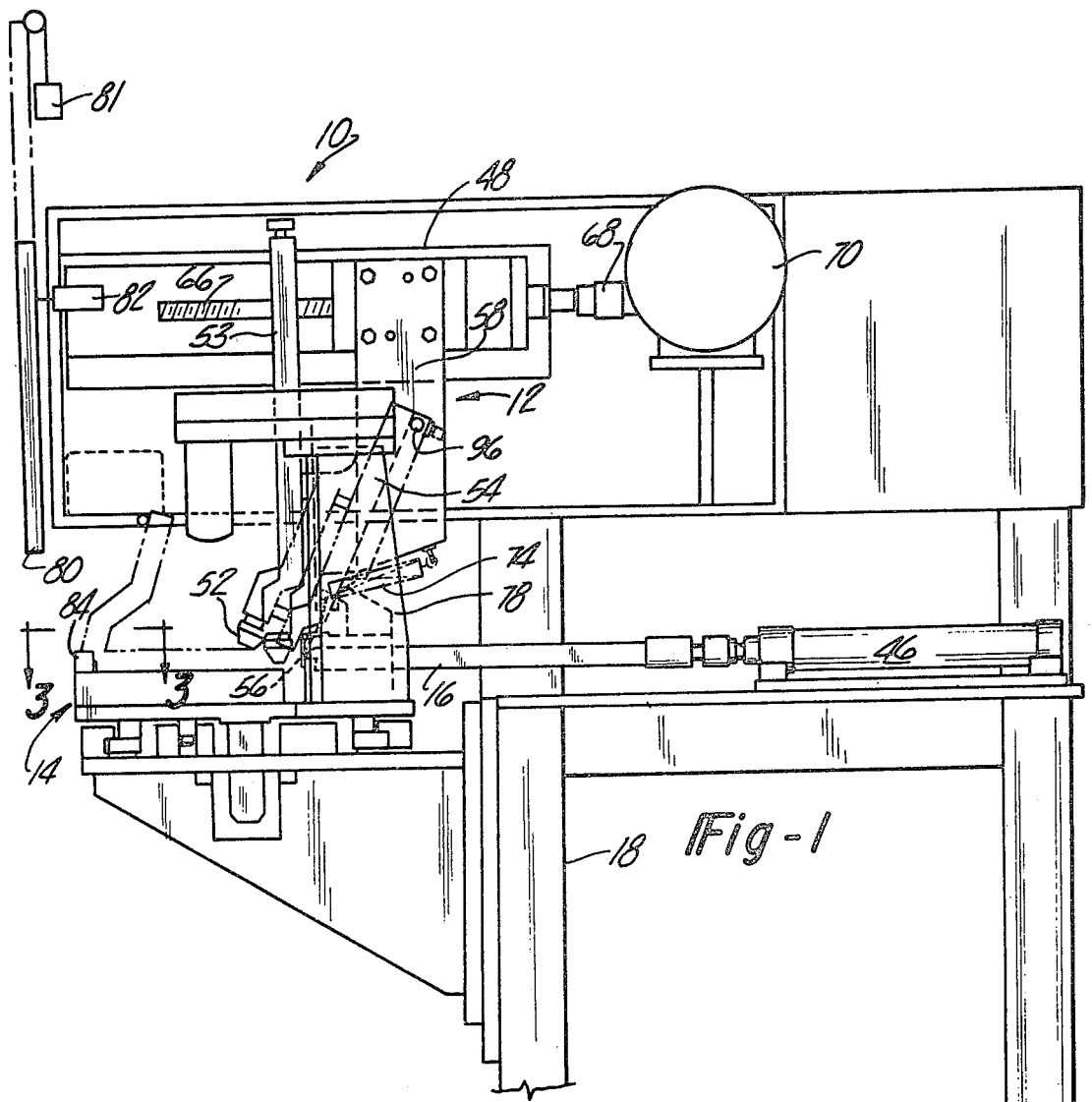
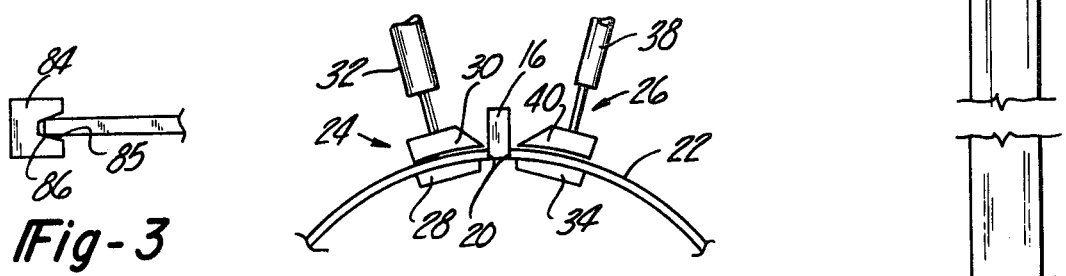

WELDING MACHINE

This application is a continuation-in-part of my application Ser. No. 639,398 filed Dec. 10, 1975, now abandoned.

This invention relates to welding machines and particularly welding machines for automatically and accurately positioning and welding parts to each other and ejecting the welded parts from the machine.

In the repeated welding of like parts in manufacturing processes it is necessary that the parts to be welded be accurately positioned relative to each other and to a welding head during the welding process and that the parts be removed rapidly in readiness for the next parts to be welded.

It is particularly difficult to accurately align adjacent edges of workpiece portions so that they can be welded by plasma type welders. With such welding apparatus it is necessary that the edges to be welded be brought together very accurately and once the weld begins the workpiece portions remain stationary relative to each other as opposed to some forms of butt welding in which the edges actually are forced against each other to displace some of the metal which is melted during the welding process.

It is an object of the invention to provide an automatic welding machine by which adjoining edges of parts are accurately positioned relative to each other and to a welding head.

It is another object of the invention to provide a welding machine including a gauge for accurately positioning the parts relative to each other and in which the gauge is employed to eject the parts from the machine.

Still another object of the invention is to provide a machine in which parts are accurately positioned relative to each other and to the path of a welding head and are welded together and are ejected from the machine all at a high rate of speed.

Another object of the invention is to provide a welding machine in which the parts to be welded are accurately positioned relative to a gauge mechanism after which the gauge mechanism is removed and the parts are moved together a distance greater than the thickness of the gauge mechanism to insure that the ends of the parts are pressed into tight abutting relationship with each other.

A further object of the invention is to provide a welding machine in which the parts to be welded are located against opposed faces of a gauge bar and subsequent clamping of the parts serves to force the ends of the parts against the gauge mechanism to insure accurate alignment.

A welding machine is provided in which edges of work pieces to be welded together to form an article or finished work piece are positioned with the edges in engagement with a gauge which automatically moves to an inoperative position after which the pieces are moved towards each other into abutting relationship with consistant abutting pressure and are located in the path of a movable welding head which is moved to an inoperative position after the weld is completed and the gauge acts to eject the welded part from the machine, with all such operations being synchronized for rapid welding of a large series of articles in repeated succession.

FIG. 1 is a side elevation of the welding machine embodying the invention with portions of the machine shown schematically;

FIG. 2 is a front elevation of the welding machine seen in FIG. 1;

FIG. 3 is a view of a portion of the welding machine taken generally on line 3—3 in FIG. 1;

FIG. 4 is a view of a portion of the welding machine seen in FIG. 2 but at an enlarged scale and showing a different condition of operation;

FIG. 5 is a schematic view showing the electrical control circuit and the various associated components of the welding machine;

Figure 6:
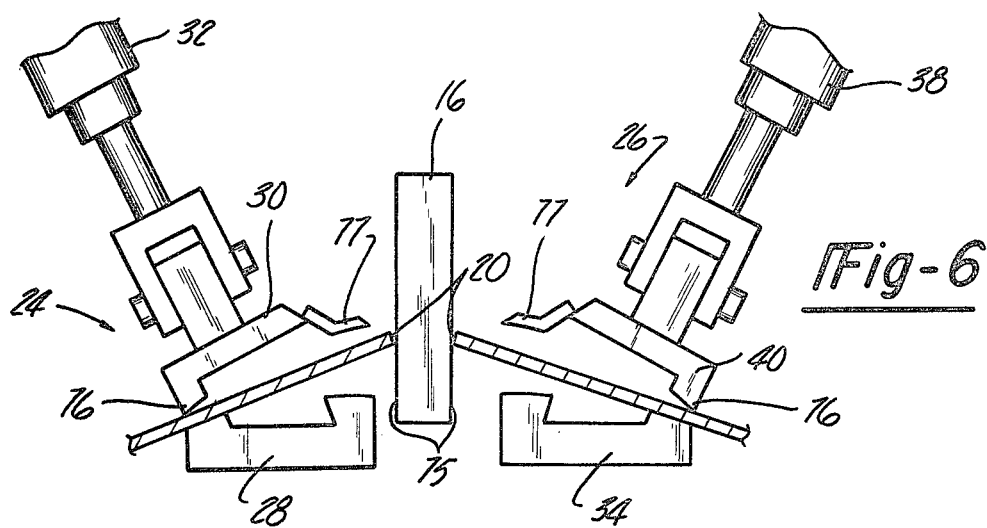
FIG. 6 is a view of a portion of the welding machine seen in FIG. 2 but at an enlarged scale and illustrating the initial positioning of the workpiece portions.

Referring to the drawings a welding machine embodying the invention is designated at 10 and includes a welding head 12, a clamp assembly 14, and a gauge member 16, all of which are supported on a frame structure 18. The welding machine 10 is particularly adapted for welding together the abutted ends 20 of a strip of metal which has been preformed into a general circular hoop 22.

Figures 2, 5:
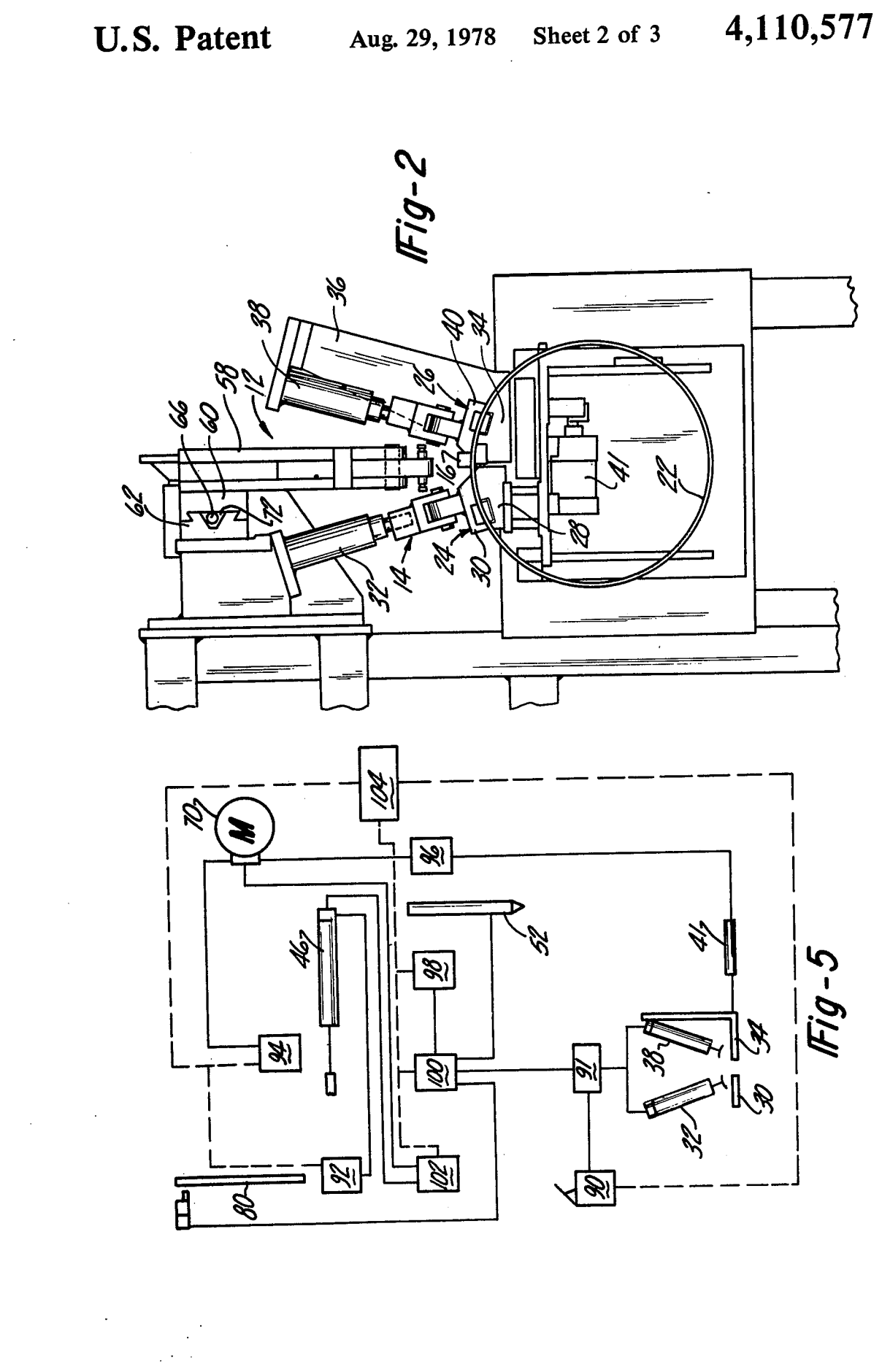

As best seen in FIG. 2, the clamp assembly 14 includes a left clamp assembly 24 and a right clamp assembly 26 which are used to hold the respective ends 20 of the hoop 22 during the welding operation. The left clamp assembly 24 includes a stationary work support 28 mounted in the stationary position relative to the frame 18 and a vertically movable clamp member 30 which can be moved vertically relative to the work support 28 by means of a hydraulic cylinder 32.

The right clamp subassembly 26 includes a work support 34 which is supported relative to the frame 18 for horizontal movement relative to the work support 28. The work support 34 has a bracket member 36 extending upwardly to support a hydraulic cylinder 38, the rod end of which is provided with a clamp member 40. The cylinders 32 and 38 are operated simultaneously from a common hydraulic source, not shown, and are disposed at a slight angle to the vertical so that the clamp members 30 and 40 are moved generally radially of the hoop 22 relative to the ends 20 during clamping and unclamping of the hoop 22 in a working position. The clamp member 40 together with the cylinder 38 and the bracket 36 all slide horizontally as a unit with the work support 34. Such movement is accomplished by a hydraulic actuator 41 which retracts to move the assembly to the left in FIG. 2 and which extends to move the slide assembly to the right.

The gauge member 16 is supported on the frame 18 for movement generally horizontally between retracted and extended position shown in full line and broken line positions, respectively in FIG. 1. In the extended position the gauge member 16 is disposed between the right and left clamp subassembly 24 and 26 when the latter are in spaced apart relationship as seen in FIG. 4. Movement of the gauge bar 16 is accomplished by the hydraulic cylinder 46 supported in a generally horizontal position on the frame 18 at the rear of the machine 10.

The hoop 22 is placed in position in the welding machine 10 when the clamp assembly 24 and 26 are in spaced apart relationship as seen in FIG. 4. This is accomplished by placing the ends 20 on the left work support 28 and the right work support 34 with the ends 20 in abutting relationship with the gauge member 16. Thereafter the clamps 30 and 40 are moved downwardly by the hydraulic cylinders 32 and 38 into engagement with the ends 20 to clamp them against the respective supports 28 and 34.

The welding head 12 is supported relative to an overhead track structure 48 forming part of the frame 18 for movement longitudinally of the track structure. The welding head assembly 12 includes a welding nozzle 52 which in the preferred embodiment of the invention is a nozzle of the plasma type welder more fully disclosed in U.S. Pat. No. 2,806,124 to R. M. Gage. The welding nozzle 52 includes a generally vertically extending tubular portion 53 through which the arc and arc gases pass. The nozzle 52 is mounted on a guide bracket 54 for movement therewith. The guide bracket 54 is pivotally mounted for swinging movement about an axis indicated at 56 relative to a movable mounting structure or trolley 58. As seen in FIG. 1, the trolley 58 is connected at its upper end to grooved member 60 which slidably receives a tongue member 62. The tongue member 62 is mounted rigidly on the track structure 48 of the frame 18 and has a generally V-shaped configuration which receives a longitudinally extending screw 66. As seen in FIG. 1 the screw 66 is connected by means of a coupler 68 to direct current motor 70 which is reversible and of variable speed. Rotational movement of the reversible motor 70 is transmitted by way of the coupler 68 to the screw 66 which is threadedly engaged with a drive portion 72 (FIG. 2) forming part of the grooved member 60. Consequently, rotational movement of the motor 70 causes sliding movement of the grooved member on the tongue member 62 and movement of the welding nozzle 52. Movement of the welding nozzle 52 ia used to actuate electrical switches in a control circuit to be discussed later.

In addition to movement longitudinally of the track structure 50, the nozzle 52 may be pivoted about the axis indicated at 56 between the full line and the broken line positions shown in FIG. 1. A tension spring 74 is interposed between the guide bracket 54 and the trolley assembly 58 so that the welding nozzle 52 is continuously urged towards its vertical position seen in FIG. 1.

A limit stop 78 is mounted in the path of movement of the welding nozzle 52 so that as the welding head 52 moves from left to right as viewed in FIG. 1, the guide bracket 54 engages stop 78 and causes the welding nozzle 52 and the support bracket 54 to pivot to the full line position.

At a forward portion of frame 18, welding machine 10 is provided with a gate 80 which is mounted to slide vertically between open and closed positions. The gate 80 is balanced by a counterweight 81 so that manual movement is required by the operator to move the gate to its closed position. Closing the gate serves to bring it into engagement with a latch mechanism 82 to maintain it in its closed position and opening of the gate is achieved electrically by actuation of a solenoid forming part of the latch 82. The purpose of the gate 80 is to shield an operator of the machine from the operation of the welding nozzle 52.

Also located at a forward part of the machine 10 is a guide block 84 which as seen in FIG. 3 has a V-notch 85 to receive the forward tapered end 86 of the gauge 16 to insure that the gauge is accurately aligned in parallel relationship to the track structure 48 and therefore to the path of the welding head. When the tapered end 86 is disposed in the V-notch 85, the gauge 16 is accurately aligned and it is at this time that the ends 20 of the workpiece are placed into butting relationship to accurately gauge the ends 20 of the workpiece 22.

In the unloaded initial condition of the welding machine 10, the left and right clamp subassemblies 24 and 26 will be spaced apart horizontally with the gauge member 16 disposed therebetween as best seen in FIG. 4. The left and right clamps 30 and 40 will be in their open position with the hydraulic cylinders 32 and 38 retracted. At the same time the welding nozzle 52 will be in its fully tilted position with the guide bracket 54 in engagement with the stop member 78 so that the welding head 52 is disposed at an angle to the vertical with the end of the nozzle 52 above the path of movement of the gauge member 16.

Figure 7:
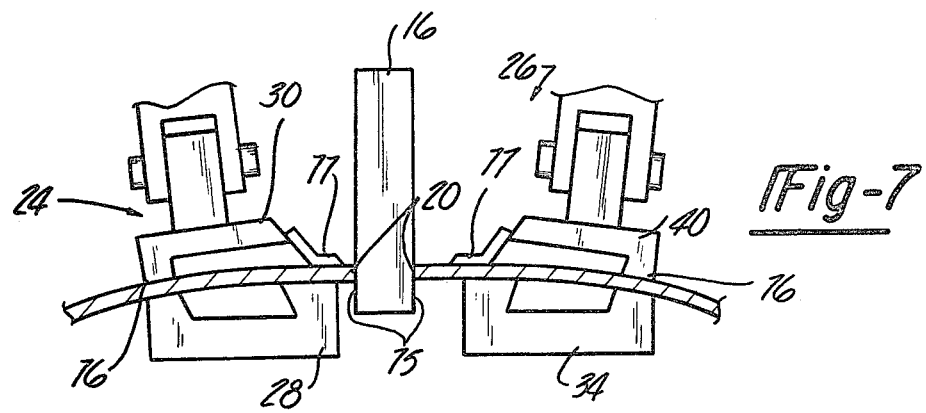
FIG. 7 is a view similar to FIG. 6 showing a subsequent condition of operation in which the workpiece portions are clamped.

Under the above conditions, an operator utilizing the machine places an elongated strip of material which has been preformed into a generally circular hoop 22 with the ends 20 on the work supports 28 and 34 so that the ends 20 abut the gauge member 16 at its opposite sides. When the strip of material to be welded is relatively thin and flexible it is unnecessary to preform the material into a generally circular hoop 22 since the material can be easily flexed by the operator to place the opposite end edges 20 in abutment with the gauge member 16. The opposed surfaces 75 of the gauge bar 16 are accurately formed to be parallel to each other so that as seen in FIG. 6 when the ends 20 of the workpiece portions are placed in engagement with the surfaces 75, they also are parallel. Moreover, when the part is not preformed or the end portions are allowed to remain flat, the workpiece portions extend at an acute angle to the gauge member 16 as seen in FIG. 6. Upon actuation of a manual control such as a foot switch 90, seen in FIG. 5, the hydraulic actuators 32 and 38 are extended so that the clamp members 30 and 40 move toward the work supports 28 and 34. Initially the outboard edges 76 of the clamps 30 and 40 contact the workpiece portions and grip them to hold the workpiece portions at an angle to the gauge bar 16 as seen in FIG. 6. Subsequent extension of the cylinder 32 and 38 causes additional movement of the clamp members 30 and 40 to bring the replaceable clamp elements 77 into engagement with the top surface of the workpiece 22. Additional increments of movement of the hydraulic cylinders causes the clamps 30 and 40 to rock or pivot about the heel 76 and bend the workpiece portions to force the end edges 20 of the workpiece portions downwardly as they remain in tight engagement with the opposite surfaces 75 of the gauge member 16 until the workpiece and gauge member assume the relative position illustrated in FIG. 7. In this condition the edges 20 of the workpiece portions are in tight abutting relationship to the surfaces 75 and the workpiece portions are disposed in a common plane as well as at right angles to the surfaces 75. As a result, the ends 20 are very accurately aligned and in tight, parallel relationship to each other. Only a limited amount of rocking of the clamp members 30 and 40 is required and in the disclosed embodiment such movement is accomplished by affording a relatively loose fit in the pin and toggle arrangement connecting the cylinders 32 and 38 to the clamps 30 and 40, respectively.

With the workpiece or hoop 22 firmly gripped by the clamp subassemblies 24 and 26 the operator pulls down the gate 89 from its elevated position. As the gate 80 reaches its lower position it is automatically latched in a closed position by the latch 82 and actuates a switch 92 controlling the hydraulic actuator 46 so that the latter is retracted and causes the gauge member 16 to move toward the right as viewed in FIG. 1. As the gauge 16 approaches its extreme right position, a switch 94 (seen in FIG. 5) is energized causing the motor 70 to begin rotation so that the welding head 12 with the nozzle 52 is advanced toward the left in FIG. 1. Initial leftward movement brings the guide bracket 54 out of engagement with the stop 78 so that the spring 74 is effective to swing the welding head together with the nozzle 52 to a generally vertical position.

Figure 8:
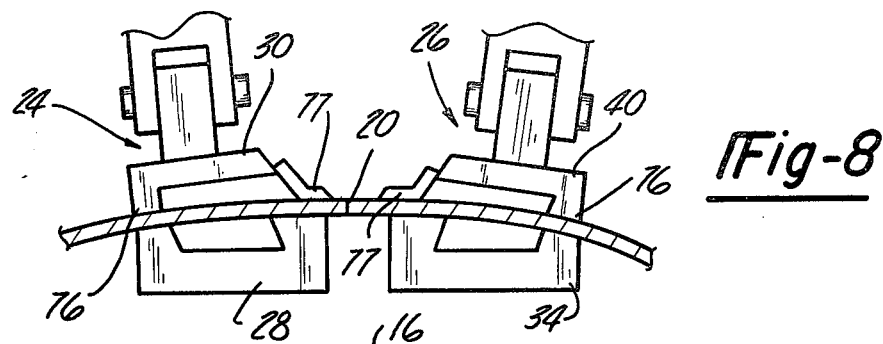
FIG. 8 is a view similar to FIG. 7 showing another condition of operation.
Figure 9:
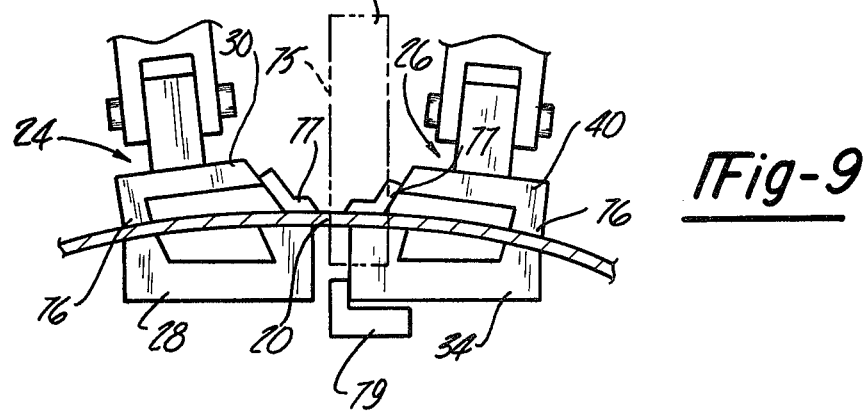
FIG. 9 is a view similar to FIG. 8 showing the workpiece portions in position for welding.

As the welding head is moving to its vertical position the guide bracket 54 disengages from switch 96 causing hydraulic actuator 41 to move the right clamp subassembly 26 toward the left as viewed in FIG. 2 to occupy the gap once occupied by the gauge member 16. Such horizontal movement of the right clamp subassembly 26 is for a greater distance than the thickness of the gauge bar 16, that is, greater than the original spacing of the ends 20 of the workpiece portions. Since the workpiece portions were originally aligned in the same plane and at opposite sides of the gauge bar 16 movement of the clamp subassembly 26 initially brings the ends 20 of the hoop 22 into abutting engagement with each other. After the parts are in abutting engagement the clamp assembly 26 is moved an additional amount during which time the associated workpiece portion slips between the clamp member 40 and support member 34. This forces the ends 20 tightly against each other to the abutting relationship in which they are held during the welding operation. To facilitate this tight abutting relationship of the ends 20, the hydraulic actuator 38 applies a lesser degree of pressure to the right clamp member 40 than is applied by the hydraulic actuator 32 to the left clamp member 30. This may be accomplished by insuring that cylinder 38 has a smaller internal diameter than cylinder 32 or by limiting the hydraulic pressure delivered to cylinder 38. In an actual embodiment of the invention the gauge bar has a thickness of approximately ⅜ of an inch so that after removal of the gauge bar and movement of the clamp subassembly 26 the latter moves a distance of ⅜ of an inch to absorb the space once occupied by the gauge bar as seen in FIG. 8. The subassembly 26 continues to move an additional amount of approximately ¼ of an inch which requires the workpiece portion held by the subassembly 26 to slip that amount before the clamp subassembly comes to a stop as determined by the full stroke of cylinder 41 or a stop 79 as seen in FIG. 9. Once the workpiece portions reach this position they are held in tight engagement with each other but no additional force is applied to press the ends 20 against each other.

When the clamp subassembly 26 reaches a final position as seen in FIG. 9, the portions are spaced apart only sufficiently to allow the welding nozzle to have access to the abutting edges 20 for conducting the welding process. In this position the expendable edge portions 77 support the workpiece portions and also tend to absorb heat generated by the weld and dissipate it to the clamp members 30 and 40 to prevent distortion of the edge portions to insure a uniform, smooth weld.

During the time that the left clamp assembly moves to a closed position, leftward movement of the welding head 12 continues until the nozzle 52 reaches the beginning of the area to be welded at which time a limit switch 98 seen in FIG. 5 is engaged by the moving trolley 58 to initiate the welding process. The welding head 52 travels the length of the seam formed by the abutting ends 20 and is in alignment with the original location of the left surface 75 of the gauge bar 16. At the end of the weld, another switch 100 is engaged by the trolley 58 to discontinue the welding operation. Simultaneously with the actuation of the switch to discontinue the welding operation, the hydraulic actuators 32 and 38 are retracted to release the clamp subassemblies 24 and 26 and the right clamp subassembly 26 moves horizontally to the right as viewed in FIG. 1. During this latter movement the counterweighted door 80 is unlatched so that it is permitted to move upward to an open position.

After discontinuation of the weld the welding nozzle 52 travels an additional amount so that the trolley 58 engages another limit switch 102 which reverses the rotation of the motor 70 and returns the welding head assembly 12 to the right in FIG. 2. Reversal of direction of welding head serves to actuate the hydraulic cylinder 46 so that it is extended causing the gauge member 16 to move to the left as viewed in FIG. 1. The left end of the gauge member will enter the gap between the right and left clamp subassemblies 24 and 26 and engage the welded hoop 22 and eject it from the work supports 28 and 34. At the same time the left end of the gauge member 16, which is formed with the cam surface at 84, engages the lower end of the guide bracket 54 to tilt the welding head 52 about the pivot 58. Thereafter the welding nozzle 52 is moved to the right at an angle in elevated relation to its welding path with the guide bracket 54 in engagement with the top of gauge member 16. As the guide bracket 54 engages the stop member 78, the welding head and bracket 54 is tilted an additional amount to engage switch 96 and the motor 70 is deenergized to terminate further rightward movement of the welding head 12. At this point in the operation, the welded hoop 22 has been ejected from the machine and parts are in condition to receive the next workpiece to be welded.

In the interest of clarity the electrical circuit by which switches 90 through 102 are actuated is shown in FIG. 5 in association with schematically represented components of the welding machine 10.

Switch 90 is connected to a source of power 104 and is operated by the foot of the operator to close a circuit to a control 91 which simultaneously actuates solenoid valves extending the clamp cylinders 32 and 38. Switch 92 which also is connected to the source of power 104 is closed in response to closing of the gate 80 to actuate a solenoid valve associated with cylinder 46 to retract gauge 16. Retraction of the gauge cylinder 46 actuates a switch 94 closing the circuit between the source of power 104 and a reversible control on the motor 70 to move the welding head 12. Switch 96 is normally held in an open position by the tilted welding nozzle 52. Movement of the welding head 12 permits the nozzle 52 to move to a vertical position so that switch 96 closes the circuit between the power source 104 and a solenoid controlled valve associated with cylinder 41 to retract the latter and close the right clamp assembly 26 relative to the left clamp assembly 24. Continued forward movement of welding head 12 actuates switches 98, 100 and 102 in succession. Switch 98 is normally open and switch 100, which is connected to the source of power 104 is normally closed and as the welding head 12 engages switch 98 the latter is closed to complete the circuit through the switch 100 and from the power source 104 to initiate the welding process. When the welding head 12 engages the switch 100 it opens it to discontinue the welding step and simultaneously releases a solenoid associated with latch 82 to permit the gate 80 to move upwardly to an open position. At the same time switch 100, which also is connected to the control 91 and to the cylinder 41, causes cylinders 32 and 38 to simultaneously retract to open the clamp assembly 24 and 26 and causes cylinder 41 to extend to move the clamp 26 horizontally to an open position. Continued movement of the welding head 12 actuates the switch 102 which is connected to the control on the motor and serves to reverse the direction of rotation and at the same time is connected to actuate the solenoid controlled valve on the cylinder 46 to extend the gauge 16. When the welding head moves rearwardly it reengages the switch 96 to close the circuit between the power source 104 and the motor 70 so that the latter stops its rotation.

The circuit is such that with the clamp assemblies 24 and 26 in closed position in response to actuation of the valve 90, subsequent closing of the gate 80 and switch 92 serves to automatically actuate each of the remaining control switches 94 through 102 in sequence to bring about automatic control of the various devices.

Although the preferred embodiment of the invention utilizes hydraulic cylinders 32, 38, 41 and 46 it will be understood that various forms of linear actuators and fluid motors may be used.

A welding machine has been provided for automatically welding abutting ends of a workpiece such as in a ring formed of a strip of material in which the ends are accurately aligned by a gauge which moves out of position to permit the ends to be moved into accurate position relative to each other and in tight engagement for welding. After welding the welded workpiece are ejected from the machine and the machine is placed in condition for receiving the next workpiece and the movements of holding gauging, welding and ejecting the workpiece occur in timed sequence.

The embodiments of the invention in which an exclusive property or privilege is claimed are defined as follows:

1. In a machine for welding adjoining workpiece portions together comprising; a gauge means movable between first and second positions, clamp means for each of said workpiece portions disposed at opposite sides of said gauge means and being operable to grip said portions and hold said portions in engagement with said gauge means when the latter is in said first position, means to move said clamp means toward each other when said gauge means is in its said second position to move said workpiece portions into abutting relationship to each other, a welding head movably supported for movement in close proximity to the abutting workpiece portions, means to move said welding head for welding said workpiece portions to each other to form a finished workpice, said clamp means being releasable from said workpiece portions and movable away from each other in response to movement of said welding head to a position completing the weld, said gauge means being movable to its first position and between said clamp means upon movement of said clamp means away from each other to engage said workpiece and eject it from said machine, said clamp means each comprising a support member and a clamp element movable relative to said support member, said clamp element and support member at one side of said gauge means being movable to grip one workpiece portion and being movable therewith as a unit relative to the other of said clamp elements, support members and workpiece portions upon movement of said gauge bar to said second position, said support member and clamp element at one side of said gauge means gripping one portion of said workpiece with a given force and the other of said clamp elements and support members gripping the other portion of said workpiece with a lesser force to permit sliding movement of said other portion in said clamp means when said portions are brought into abutting engagement with each other upon movement of said clamp means toward each other.

2. The combination of claim 1 and further comprising a pair of fluid operated cylinders associated with each of said clamp elements, respectively, one of said cylinders applying a smaller force to one of said clamp elements than applied by the other of said cylinders to the other of said clamp elements to permit sliding movement of one workpiece portion between said one clamp element and its associated support member.

3. The combination of claim 1 in which said welding head is movable in a path in close proximity to said metal members from a first position to a second position during welding and in which said welding head is movable in an elevated position above the path of said gauge means from said second towards said first position after completion of the weld.

4. The combination of claim 1 in which said welding head includes a guide portion engageable with said gauge means when the latter is in its first position to maintain said welding head in the elevated position during movement of the latter from said second to said first position.

5. The combination of claim 4 in which said welding head is movable from its elevated position to a welding position in response to movement of said gauge means to its second position.

6. The combination of claim 1 in which said machine includes gate means movable between an open position and a closed position shielding an operator from said welding head during its welding movement, and means operative in response to movement of said gate means to its said closed position to move said gauge means to its said second position.

7. The combination of claim 6 in which said gate means is movable to its said open position in response to movement of said welding head to a position completing said weld.

8. A machine for welding adjoining workpiece portions together comprising, gauge means movable between a first and second position, a pair of clamp means to clamp each of said workpiece portions disposed at opposite sides of said gauge means and being operable to grip opposite surfaces of said portions and hold said portions in engagement with said gauge means and in alignment in the same plane when the gauge means is in said first position, said gauge means having a predetermined width, means to move said clamp means towards each other when said gauge means is in said second position to move said workpiece portions towards, each other, said clamp means being movable a distance greater than the thickness of said gauge means to bring said workpiece portions into tight abutting relationship with each other and wherein one workpiece portion slips relative to its associated clamp means upon relative movement of said clamp means towards each other, a welding head supported for movement in close proximity to the abutting workpiece portions, and means to move said welding head for welding said workpiece portions to each other to form a finished workpiece.

9. The combination of claim 8 wherein said clamp means at one side of said gauge means remains stationary during movement of the other of said clamp means toward said one clamp means.

10. The combination of claim 8 wherein one of the clamp means at one side of said gauge means is operative to grip the associated workpiece portion with a predetermined force less than the force of the clamp means at the other side of said gauge means.

11. The combination of claim 8 wherein said clamp means at one side of said gauge means is movable to a predetermined position through a distance greater than the thickness of said gauge means and wherein said pair of clamp means are held stationary in said predetermined position during welding.

12. The combination of claim 8 wherein said clamp means are releasable from said workpiece portions and are movable away from each other upon completion of the weld, said gauge means being movable from its second position to its first position and between said clamp means to engage said finished workpiece portion and move it relative to said clamp means and from said machine.

13. The combination of claim 8 in which said pair of clamp means each include a support member and a clamp element movable relative to said support member, said workpiece portion being initially positioned in engagement and at an angle to said gauge means such that movement of said clamp elements into engagement with said workpiece portions exerts a force having a component towards said gauge bar pressing said end portions into firm engagement with said gauge bar.

14. The combination of claim 8 wherein said clamp means are operative to initially engage and clamp said workpiece portions at a location spaced from the ends of said workpiece portions when the ends are in engagement with said gauge means and with said workpiece portions diverging away from opposite sides thereof at an acute angle, said clamp means being operative to subsequently engage said workpiece portions at a second location closely adjacent said ends of said workpiece portions to move said workpiece portions from an acute angle relative to the surfaces of said gauge means to a position in which said portions are disposed in said plane.

* * * * *

UNITED STATES PATENT AND TRADEMARK OFFICE
CERTIFICATE OF CORRECTION

PATENT NO. : 4,110,577
DATED : August 29, 1978
INVENTOR(S) : Edward G. Spisak

It is certified that error appears in the above-identified patent and that said Letters Patent are hereby corrected as shown below:

Column 3, line 40, "ia" should read --is--

Column 5, line 3, "89" should read --80--

Column 7, line 61, "workpice" should read --workpiece--

Column 8, claim 4, line 32, claim "1" should read claim --3--

Signed and Sealed this

Tenth Day of April 1979

[SEAL]

Attest:

RUTH C. MASON
*Attesting Officer*

DONALD W. BANNER
*Commissioner of Patents and Trademarks*